April 24, 1956     H. E. BALSIGER     2,743,142
BEARING CONSTRUCTION
Filed Feb. 20, 1952     2 Sheets-Sheet 2
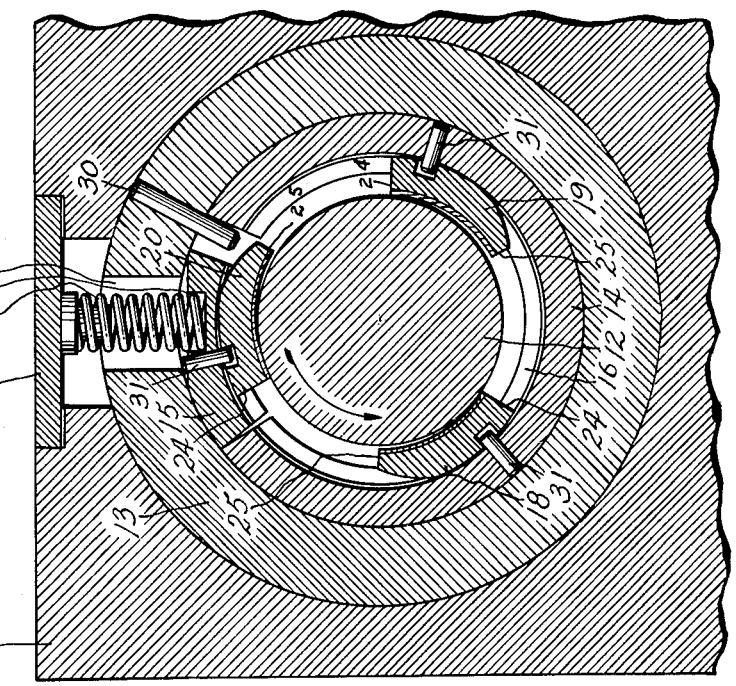
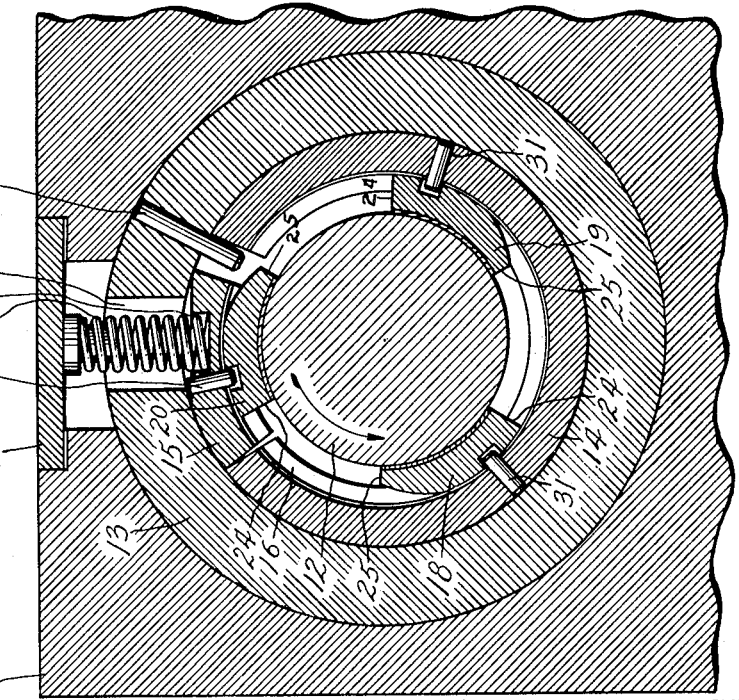
INVENTOR.
HAROLD E. BALSIGER
ATTORNEY

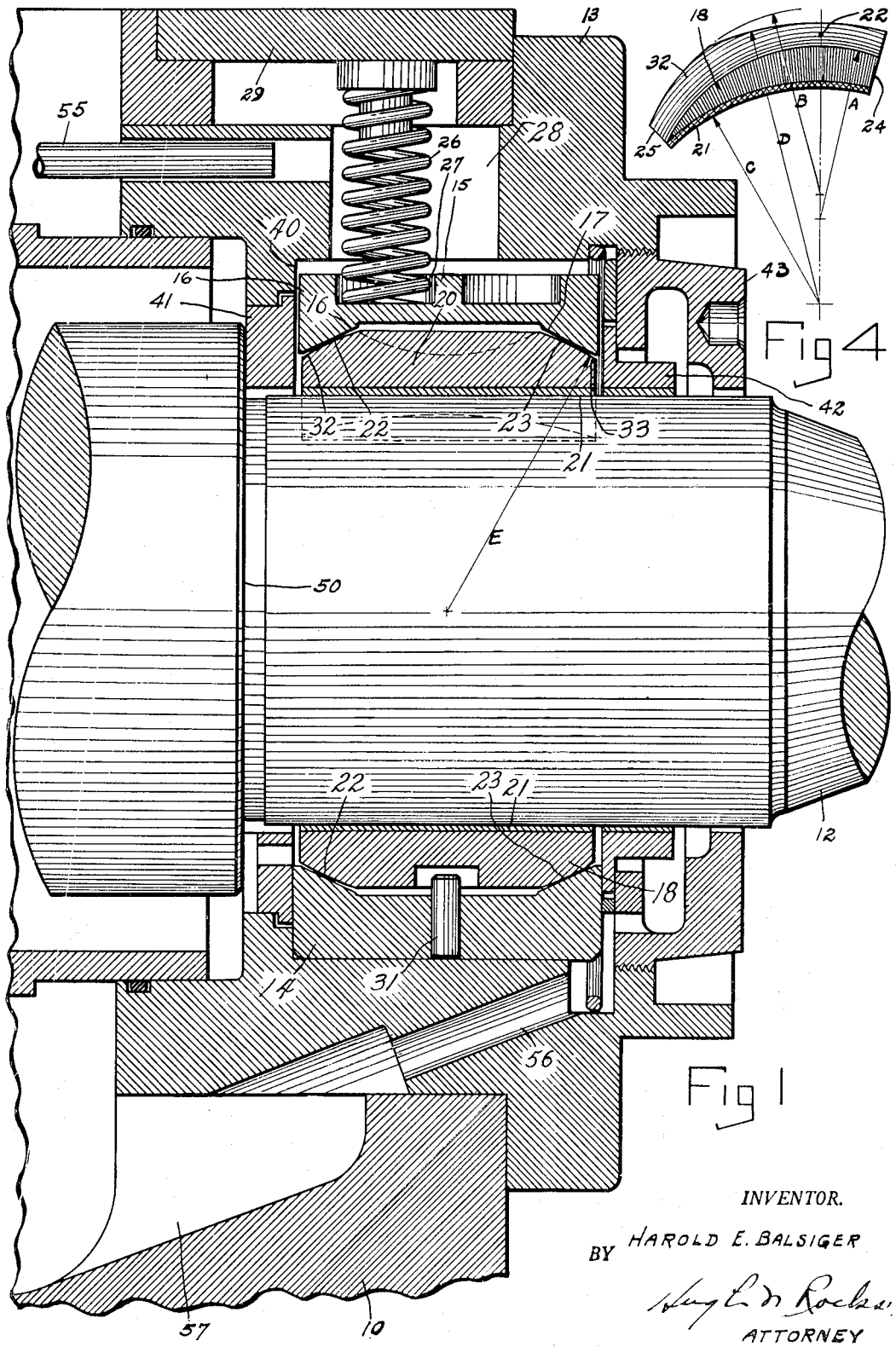

United States Patent Office 2,743,142
Patented Apr. 24, 1956

2,743,142

BEARING CONSTRUCTION

Harold Edward Balsiger, Waynesboro, Pa., assignor to Landis Tool Company, Waynesboro, Pa.

Application February 20, 1952, Serial No. 272,624

9 Claims. (Cl. 308—73)

This invention relates to bearings for machine tool spindles, particularly to bearings of the multiple shoe type.

In previous bearings of this type, self alignment was accomplished by pivoting the shoe at a point substantially midway between its ends. While such a bearing mounting provided a high degree of flexibility, it lacked the rigidity essential to proper support of a rotating spindle. Bearing shoes of this type are usually pivoted for the purpose of permitting the shoe to rock slightly in a direction at right angles to the axis of the spindle in response to lubricant forced thereunder by the pumping action of the rotating spindle. Since it is highly desirable that such bearings be self-aligning, they have only a single pivot about which the shoe may rock transversely of the spindle axis for the purpose of providing an oil wedge thereunder as well as for rocking axially to align itself with the spindle. With this arrangement, the bearing could not be both self-aligning and sufficiently rigid.

It is therefore an object of this invention to provide self-aligning shoe type bearing in which there is no sacrifice of rigidity.

A further object is to provide a bearing in which the shoes are self-adjusting radially.

A further object is to provide a bearing arrangement in which each shoe has maximum rigidity, with minimum contact with the housing or retaining ring.

A further object is to provide a bearing shoe having axially spaced points or areas of contact with the retaining ring which are also pivot points on which the shoe rocks during rotation of the spindle.

In the drawings, Figure 1 is a partial sectional front elevation showing the invention applied to one end of a machine tool spindle.

Figure 2 is an end elevation showing the position of the shoes relative to the spindle when the spindle is at rest.

Fig. 3 shows the position of the shoes when the spindle is in motion.

Figure 4 is an end elevation of a bearing shoe showing the relation between the bearing surface and the outer surface of the shoe and the location of one of the contact points.

Numeral 10 indicates a machine tool member, in this case the grinding wheel base of a grinding machine in which a spindle 12 is mounted for rotation.

The mounting for said spindle consists of a cylindrical housing 13 which may be inserted in a suitable opening in the machine tool member 10. Within said housing 13 is mounted a retaining ring in two sections, 14 and 15. Each of said sections has two spaced inwardly beveled surfaces 16 and 17 which may be slightly concave. Said beveled portions may be separate rings such as in Steiner Patent 2,277,167, March 24, 1942, instead of being parts of the same ring. In the larger of these sections 14 are mounted two bearing shoes 18 and 19 spaced about 120° apart and approximately 120° from a third, said third bearing shoe 20 is mounted in the smaller portion 15 of said ring.

Each of said bearing shoes has a curved bearing surface 21 conforming to the surface of spindle 12. Each shoe also has an axially and peripherally curved outer surface, spaced portions 32 and 33 of which have control points 22 and 23 for engaging the said beveled surfaces 16 and 17 in said retaining ring 14 and 15. Contact surfaces 22 and 23 are part of the peripherally curved, axially spaced outside surfaces 32 and 33 of said shoe, shaped so that said portions are the high points thereon and thus the points of contact with said retaining ring. On these surfaces the shoe rocks axially to conform to the spindle alignment and radially to form an oil wedge as shown in Figure 3. The contacting points 22 and 23 are located closer to the trailing edge 24 of said shoe than to the leading edge 25. These contact surfaces on the bearing shoe might be provided in any suitable manner such as making the surface higher at such points than the surrounding surface, or as in the present case providing a peripheral curve of a different radius or a different center from the bearing surface 21 located so as to provide contact points 22 and 23 in the desired position relative to the leading and trailing edges of the shoe. The area of said contact points should be in proportion to the load to be carried thereby. In Figure 4, radius lines A, B, C and D indicate that the various curves present in each of said bearing shoes have their centers on the same vertical line. Radius line E indicates the point from which the axial curve of said shoe is formed.

All three of said bearing shoes are preloaded by means of a spring 26. One end of said spring is seated in recess 27 in ring member 15. Said spring extends through an opening 28 in housing 13 to engage a plate 29 secured to base 10.

The large ring portion 14 is held against housing 13 by means of a pin 30 projecting inwardly therefrom. Bearing shoes 18, 19, and 20 are located and held in position in rings 14 and 15 by means of pins 31.

Bearing shoes and retaining ring are mounted in said housing between a shoulder 40 and a thrust ring 41 on one side and a thrust ring 42 and thrust nut 43 on the other side. Thrust ring 41 holds the bearing members in proper spaced relation to shoulder 50 on the spindle 12.

Lubricant is supplied to said bearing through tube 55 in sufficient volume to keep the bearing members submerged. Lubricant returns from said bearings through a passage 56 to reservoir 57.

I claim:

1. A bearing for a machine tool spindle comprising a housing, a retaining ring within said housing, said ring having an inwardly beveled portion at each side of the internal surface thereof, and comprising a large portion and a small portion, two bearing shoes in said large ring portion and spaced approximately 120° apart, a single shoe in said small portion and a spring engaging the outer surface of said small portion to urge same radially against said shoe and spindle, each shoe having a bearing surface substantially concentric with said spindle, an outer surface eccentric with said bearing surface, said outer surface being curved also in an axial direction whereby to provide a minimum contact between said ring and said shoes, the eccentricity of said outer surface being such that said point of contact thereon is toward the trailing edge or rear of said bearing.

2. A bearing for a machine tool spindle comprising a housing, a retaining ring within said housing, said ring having an inwardly beveled portion at each side of the internal surface thereof, and comprising a large portion and a small portion, two bearing shoes in said large ring portion and spaced approximately 120° apart, a single shoe in said small portion and a spring engaging the outer surface of said small portion to urge same radially against said shoe and spindle, each shoe having a bearing surface substantially concentric with said spindle, an outer surface eccentric with said bearing surface, said outer surface being curved also in an axial direction whereby to provide a minimum contact between said ring and said shoe, the eccentricity of said outer surface being such that said point of contact thereon is toward the trailing edge or rear of said bearing, said point of contact serving as a pivot whereby lubricant pressure causes said shoe to pivot in a counterclockwise direction to support said spindle.

3. A bearing for a machine tool spindle comprising a housing, a retaining ring within said housing, said ring having an inwardly beveled portion at each side of the internal surface thereof, a plurality of bearing shoes each having an axially curved outer surface in contact with each of said beveled portions, the inner surface of each shoe being curved to conform to the curvature of the spindle, the outer surface of each shoe being eccentric to the inner surface whereby to locate the points of contact with said beveled portions as respects the leading and trailing edges of the shoe.

4. A bearing for a machine tool spindle comprising a housing, a retaining ring within said housing, said ring having an inwardly beveled portion at each side of the internal surface thereof, a plurality of bearing shoes each having an axially and peripherally curved outer surface in contact with each of said beveled portions, the bearing surface of each shoe being curved to conform to the curvature of the spindle, the outer surface of each shoe having a high point on each of the axially curved portions of said shoe for engaging said inwardly beveled portions, said high points being closer to the trailing edge of said shoe than to the leading edge thereof.

5. In a machine tool, a rotatable spindle, a housing therefore, bearing shoes within said housing, axially spaced peripheral surfaces in said housing for supporting said bearing shoes, said bearing shoes having axially spaced, axially curved surfaces to match the supporting surfaces in said housing, the area of contact of said shoes with said housing being closed to the trailing edge of said shoe than to the leading edge, bearing surfaces on said shoes conforming in shape to the spindle with which they engage and having axial alignment with the spindle, the contacting surfaces between said shoes and said supporting surfaces serving to provide self-alignment for the bearing and also rocking action in a radial direction in response to the building up of an oil film by the rotation of the spindle.

6. In a machine tool, a rotatable spindle, a housing therefore, bearing shoes within said housing, means within said housing for supporting each of said bearing shoes on axially spaced mating surfaces, at least two of said bearing shoes having axially spaced mating surfaces at opposite ends thereof to mate with said first mentioned surfaces and said shoes having bearing surfaces to mate with said spindle, said second mentioned surfaces shaped so that said shoe will align itself axially along said spindle and be free to rock on said first mentioned surface to allow an oil film to be built up by the rotation of said spindle.

7. A multiple shoe type bearing for a machine tool spindle comprising a housing, bearing shoes within said housing, axially spaced peripheral surfaces within said housing for supporting said bearing shoes, said bearing shoes having axially spaced surfaces corresponding to said axially spaced supporting surfaces, said shoes having bearing surfaces for engaging said spindle, said spindle engaging surfaces being shaped so that each shoe will align itself axially along said spindle and be free to rock on said axially spaced supporting surfaces to allow an oil film to be built up by the rotation of said spindle.

8. A bearing for a machine tool spindle comprising a housing, a retaining ring in said housing, a plurality of bearing shoes, each having an axially curved outer surface, said retaining ring having axially spaced beveled portions for engaging said curved outer surface of said bearing shoes whereby said shoes may conform to the alignment of the spindle, the points of contact between said shoe and said ring having an area proportioned to the load to be placed on the bearing, the inner surface of each of said bearing shoes being curved to conform to the curvature of the spindle, the outer surface of each shoe being eccentric to the inner surface, whereby to locate the area of contact with said beveled portions in predetermined relation with the leading and trailing edges of the shoe.

9. In a machine tool, a spindle, a housing therefor, a retaining ring in said housing, a plurality of bearing shoes each having bearing surfaces on the inner side and having said spindle rotatably mounted therein, each of said shoes having an axially curved outer surface, said retaining ring being shaped for engaging said curved outer surface of said bearing shoes at axially spaced points thereon, whereby said shoes may move in the plane of said axis to conform to the alignment of said spindle and at the same time provide a rigid support for said spindle.

References Cited in the file of this patent
UNITED STATES PATENTS

| | | |
|---|---|---|
| 2,219,669 | Wallgren | Oct. 29, 1940 |
| 2,348,928 | Sampatacos | May 16, 1944 |